United States Patent [19]

Tanaka et al.

[11] Patent Number: 5,095,427
[45] Date of Patent: Mar. 10, 1992

[54] DISPATCH CONTROL OF VIRTUAL MACHINE

[75] Inventors: Shunji Tanaka, Machida; Hidenori Umeno, Kanagawa, both of Japan

[73] Assignee: Hitachi, Ltd., Tokyo, Japan

[21] Appl. No.: 365,694

[22] Filed: Jun. 14, 1989

Related U.S. Application Data

[63] Continuation of Ser. No. 2,435, Jan. 12, 1987, abandoned.

[30] Foreign Application Priority Data

Jan. 14, 1986 [JP] Japan .................................. 61-5391

[51] Int. Cl.⁵ ...................... G06F 15/16; G06F 12/08
[52] U.S. Cl. .................... 395/700; 364/228.1; 364/228.2; 364/230.3; 364/246.8; 364/262.8; 364/DIG. 1
[58] Field of Search ... 364/200 MS File, 900 MS File

[56] References Cited

U.S. PATENT DOCUMENTS

| 4,189,771 | 2/1980 | Roerer | 364/300 |
| 4,253,145 | 2/1981 | Goldberg | 364/200 |
| 4,333,144 | 6/1982 | Whiteside et al. | 364/200 |
| 4,400,769 | 8/1983 | Kaneda et al. | 364/200 |
| 4,553,202 | 11/1985 | Trufyn | 364/200 |
| 4,674,038 | 6/1987 | Bretsford et al. | 364/200 |

OTHER PUBLICATIONS

Computer Architecture and Parallel Processing, Briggs, F. A. & Hwang, K., 1984, p. 18.

*Primary Examiner*—Gareth D. Shaw
*Assistant Examiner*—Kakali Chaki
*Attorney, Agent, or Firm*—Sterne, Kessler, Goldstein & Fox

[57] ABSTRACT

A method and a system in a virtual machine system controlling a simultaneous run of one or more operating systems (OS's) by use of a virtual machine control program on a real machine including a storage area for each virtual processor constituting the virtual machine for saving a status of each virtual processor, for storing an active flag indicating whether or not the virtual processor is in the active state, and for storing a running priority specified for each virtual processor by the control program wherein when an OS being running issues an instruction to set the processor to the wait state, the instruction is directly executed, a state of the virtual processor being running is stored in the status save area, a processor is selected from processors for which the nonactive state is set, a virtual processor is selected according to the running priority from a group of virtual processors not in the wait state nor in the active state, and a content of the status save area of the virtual processor is set to the processor.

11 Claims, 4 Drawing Sheets

DISPATCH CONTROL OF VIRTUAL MACHINE

This application is a continuation of application Ser. No. 07/002,435, filed Jan. 12, 1987, now abandoned.

BACKGROUND OF THE INVENTION

1. Field of the Invention

The present invention relates to dispatch control of a virtual machine, and in particular, to a dispatch control method and a dispatch control system which effectively utilize each processor in a virtual machine system constructed in a multiprocessor configuration.

2. Description of the Prior Art

A virtual machine system (to be abbreviated as a VMS herebelow) is a system in which one or more operating systems (OS's) are allowed to achieve a simultaneous operation under the control of a machine. A virtual machine control program (to be abbreviated as a VMCP herebelow) is a program effecting a control to implement a system in which a machine called a virtual machine (to be abbreviated as a VM herebelow) seems to exist for each OS in a real machine.

To enable one or more OS's to run at the same time, the VMS is required to perform a change-over processing between virtual processors on a VM using processors of the machine. Heretofore, a privileged instruction issued from an OS is simulated by the VMCP; however, to speed up the processing, there have been developed techniques for effecting a higher operation by use of a microprogram simulation and for directly executing the priviledged instruction by a hardware. In a virtual machine system, if selection and activation of a virtual processor to be next operated are softwarewise accomplished, the overhead of the software becomes considerably great.

For example, the JP-A-59-167756 describes a method in which when a virtual processor enters an idle state or the like in a processor of a machine, the virtual processor is changed over by use of a hardware and a microprogram. According to this method, an efficient usage is implemented for a processor on which the virtual processor set to the idle state was running.

In the method above, however, an efficient usage has not been described for a processor in a case of a VM in the multiprocessor configuration where an OS effects a loop in a first virtual processor of the VM because of a lock of another virtual processor on the same VM. Although an efficient utilization has been described for a processor on which the virtual processor set to the idle state or the like was running, an efficient usage has not been described for another processor not in an active state at this point of time.

A task (or a process) is a unit of a job to be processed in a computer system, and when all necessary resources other than a CPU are reserved, the task enters an executable state waiting for an allocation of the CPU. A task waiting for an execution because the resources other than a CPU cannot be reserved installed to be in the wait state. When the CPU is allocated to a task in the executable state, the task enters an active state. If a task being executed is robbed of the CPU by a task having a higher priority, the task returns to the executable state. That is, a task is in the active, executable, or wait state. The CPU is allocated to a task in the executable state by a dispatcher, which controls the CPU to supervise execution of tasks and is a special part constituting the kernel of the OS.

SUMMARY OF THE INVENTION

It is therefore an object of the present invention to provide a dispatch control method for a virtual machine achieving an efficient utilization of a processor in which when a virtual processor on a VM is set to the wait state or when an OS enters a loop state due to a lock of another virtual processor on the same VM, a virtual processor which can run is allowed to be activated on a processor in which the virtual processor is running and on a processor not in the active state, thereby improving the problems of the prior art techniques.

To achieve the object, the present invention is characterized in that in a virtual machine system controlling by a virtual machine control program a simultaneous running of one or more operating systems (OS's) on a real machine, there are provided storage areas for each virtual processor constituting the virtual machine for saving a status thereof, for storing an active flag indicating whether or not the virtual processor is act , and for storing a running priority specified by the control program; that when an OS being running issues an instruction which causes the processor to be set to the wait state, the instruction is directly executed, a status of the virtual processor being running is stored in the status save area, and a non-active state is set to the active flag of the virtual processor, furthermore, a processor is selected from processors for which the non-active state is set, a Virtual processor is selected from a group of virtual processors which are not in the wait state nor in the active state according to the running priority, the active state is set to the active flag of the virtual processor, and the content of the status save area of the virtual processor is set to the processor, thereby activating the virtual processor.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

First, an outline of the present invention will be described in detail.

According to the dispatch control method for a virtual machine of the present invention, for each virtual processor on each VM in the VMS, there are provided areas for saving the processor status and for storing the active flag, the running priority and the time slice value set by the VMCP and a processor status table for each processor constituting the machine for indicating whether or not the processor is in the active state. The processing to change over the virtual processor according to the present invention will be described for each cause of the change-over operation.

(1) In a case where an OS on a VM being running issues an instruction to set the processor to the wait state and the instruction is directly executed by the hardware and the microprogram without any intervention of the VMCP, which results in the wait state of the virtual processor. Then, the mechanism and the microprogram for saving the virtual processor status store the status of the virtual processor being running in the status save area. Also, the nonactive state is set to the active flag of the virtual processor. Next, the mechanism and the microprogram for saving the virtual processor status pass control to a group of dispatch instructions in the main memory. The group of dispatch instructions selects a processor for which the nonactive state is set to the processor status table and sets the active state to a field of the processor status table corresponding to the processor. In addition, from a group of virtual processors not in the active state, a virtual processor having the highest running priority is selected and the active state is set to the active flag of the virtual processor. However, when such a virtual processor satisfying the condition is missing, the nonactive state is set to the field of the processor status table associated with the selected processor. An indication that the selected virtual processor is to run on the selected processor is set to the processor status table. Next, to cause an external interruption in the selected processor, the dispatch instruction group issues an instruction SIGP (Signal Processor) which has been conventionally used for a multiprocessor. This causes an external interruption to be reported to the processor to which the SIGP has been issued, and an interruption processing program for the interruption executes processing as follows. That is, the interruption processing program identifies a virtual processor to run on the processor based on the processor status table, sets the time slice value of the virtual processor to the timer of the processor, and the content of the status save area of the virtual processor is set to the register of the processor, thereby enabling the selected virtual processor to enter the running state.

By repetitiously achieving the processing above, the dispatch instruction group is capable of running a virtual processor on a processor for which the nonactive state is indicated in the processor status table.

Next, from a group of virtual processors not in the wait state nor in the active state, the group of dispatch instructions selects a virtual processor having the highest running priority and sets the active state to the active flag of the virtual processor. However, if such a virtual processor satisfying the condition is missing, the nonactive state is set to a field of the processor status table corresponding to the processor executing the processing. If a virtual processor satisfying the condition is present, the time slice value of the virtual processor is set to the timer and the content of the status save area of the virtual processor is set to the register of the processor, thereby enabling the selected virtual processor to enter the running state on the processor.

(2) In a case where an interruption is directly executed by the hardware and the microprogram on a second virtual processor while a first virtual processor is running and the wait state of the second virtual processor is released by the interruption, the mechanism for saving the virtual processor status is activated in a portion of the interrupt processing and the virtual processor is activated through the processing similar to that of (1).

(3) In a case where after a virtual processor starts running, an interruption processing for a lapse of time equal to a time slice value specified by the virtual processo is directly executed by the hardware and the microprogram without any intervention of the VMCP, the mechanism for saving the virtual processor status is activated in a portion of the interruption and the virtual processor is activated in the processing similar to the processing of (1).

(4) In a case where after a virtual processor starts running, a processing to change over the virtual processor for a lapse of time equal to a time slice value specified for the virtual processor by the VMCP or where an instruction processing or an instruction to set the processor to the wait state as described in (1) and (2) above is accomplished by use of an intervention of the VMCP, VMCP or the mechanism for saving the virtual processor status and the virtual processor status save microprogram store the status of the virtual processor running up to this point in the status save area and set the nonactive state to the active flag of the pertinent virtual processor. Next, according to the cause of the control transfer to the VMCP, the VMCP performs the processing for the lapse of the time slice, the simulation of the instruction setting the processor to the wait state, the interruption processing, and issues an instruction for selecting and activating a virtual processor according to the present invention.

This instruction causes to pass control to the dispatch instruction group described in (1) above and hence to activate the selected virtual processor on the selected processor according to the running priority.

(5) In a case where during a VM is running, an OS on the VM issues an instruction of an instruction code specified in means keeping at least one pair of an operation code and a condition code of a particular instruction set according to the present invention and the condition code matches with a condition code of the keeping means, the processing is achieved as follows. In an OS under the control of a computer constituting a multi-processor, a technique of locking is generally used to prevent a contention among a plurality of processors referencing or updating the same memory. Namely, when a processor effects a lock on a particular memory by use of a particular instruction, the other processors cannot make reference to or update the memory unless the processor that has locked the memory unlocks the memory. In a virtual machine system, even if two real processors are provided, a virtual processor does not necessarily run on the same VM. Consequently, if an OS on a processor enters a loop to wait for an unlock operation to be executed on a locked area of the VM, it is desirable to run the virtual processor on the VM to which the lock has been achieved so as to unlock the locked area.

Whether an area has been locked or not can be judged by checking to determine whether or not a particular condition code is required for a particular instruction. According to the present invention, there is provided a register for keeping the operation code and the condition code. When an OS in a VM issues such an instruction and the condition code of the instruction is a particular condition code described above, the mechanism for saving the virtual processor status and microprogram for saving the virtual processor status are activated to store the status of the virtual processor being running in the pertinent status save area and the nonactive state is set to the active flag.

The virtual processor status save mechanism and the virtual processor status save microprogram then pass control to the dispatch instruction group in the main memory. The group of dispatch instructions effects the udgment and selection for the status of the virtual processors on the VM where the virtual processor was running up to this point and then set the virtual processor in the running state in the same method as for (1) above.

The outline of the processing executed by the virtual processor change-over control method according to the present invention has been described. The running priority of each virtual processor may be fixedly assigned from the VMCP by use of a command or the like, or the VMCP may dynamically vary the running priority, for example, depending on the processor utilization ratio during a run of the virtual processor. With the provision of a table including the correspondences between the running priority values and the time slice values, the time slice value of each virtual processor may also be dynamically controlled.

According to the present invention as described above, with a reduced amount of hardware and a minimized volume of microprogram, the next virtual processor to be run is selected and activated depending on the running priority specified by the VMCP, thereby reducing the overhead.

Figure 1:
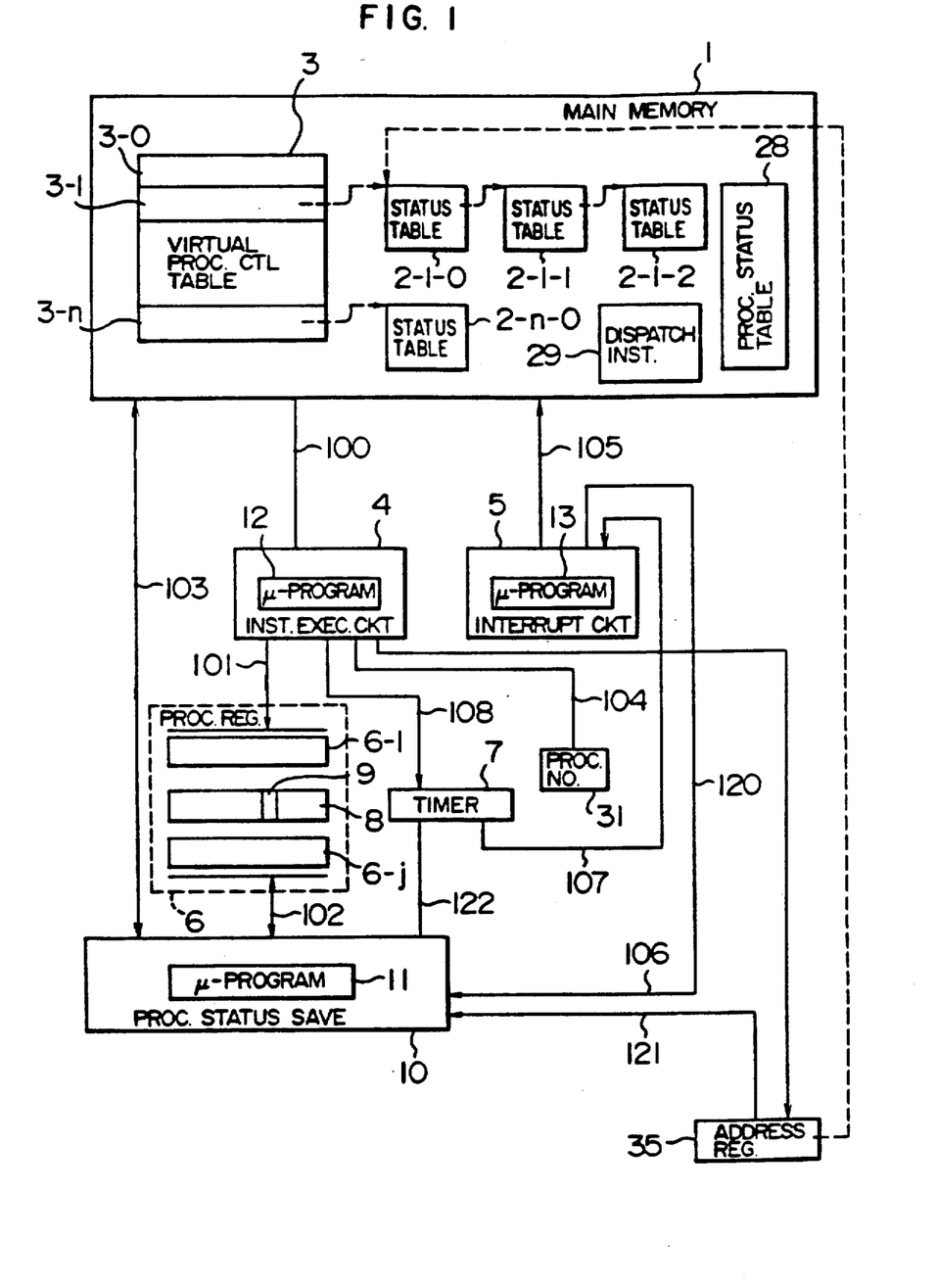
FIG. 1 is a schematic block diagram showing a VMS of an embodiment of the present invention.

Next, the embodiments of the present invention will be described in detail by referring to the accompanying drawings. FIG. 1 is a schematic block diagram showing the VMS as an embodiment of the present invention. The system of FIG. 1 comprises a main memory 1, an instruction execute circuit 4, an interruption circuit 5, a processor register 6 for controlling the processor, a timer 7 for transmitting a virtual processor change-over signal through a line 107 to the interruption circuit 5, a mechanism 10 for saving the virtual processor status, and an address register 35.

The main memory 1 is provided with status tables 2-1-0 to 2-n-0 each having information necessary to set each virtual processor on a VM under the control of VMS to the running state. A virtual processor control table 3 is used to queue the virtual processor status tables 2-1 to 2-n according to the running priority. For the tables 3-i to control virtual processors which can be run, the status tables 2-1 to 2-n having the higher running priority and queued therein in the ascending order of i values. In FIG. 1, three status tables 2-1-0, 2-1-1, and 2-1-2 are queued in the virtual processor control table 3-1 having the second highest running priority, whereas a status table 2-n-0 is queued in the virtual processor control table 3-n having the lowest running priority. A processor status table 28 is a control table for controlling the status of the processors constituting the machine. A group of dispatch instructions 29 is an instruction group for selecting a virtual processor and a processor to effect an activation of the virtual processor on the processor. Reference numeral 12 indicates a microprogram for executing instructions in the instruction execute circuit 4, whereas reference numeral 13 is an interruption microprogram in the interruption circuit 5. Moreover, the processor register 6 is provided with a program status word (PSW) 8, which contains a wait bit 9 for indicating whether or not the processor is in the wait state. When the wait bit 9 contains a value of "1", the processor is indicated to be in the wait state, whereas when the wait bit 9 is "0", the processor is in other than the wait state. Reference numerals 6-1 to 6-i each denote processor registers. The virtual processor status save mechanism 10 includes a virtual processor status save microprogram 11. An address register 35 is used to store an addresses of the virtual processor status tables 2-1 to 2-n of the virtual processors being running, whereas a processor number register 31 keeps a processor number of the pertineht processor. In the case of FIG. 1, the virtual processor corresponding to the status table 2-1-0 is indicated to be running.

Figure 2:
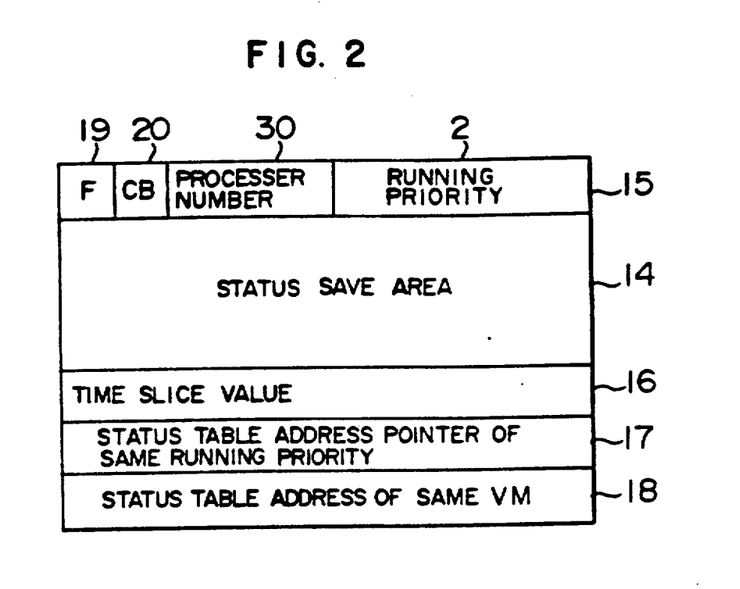
FIG. 2 is an explanatory diagram of a status table of FIG. 1.

FIG. 2 is a schematic diagram illustrating the configuration of the status table 2 of FIG. 1. The configuration of FIG. 2 includes a status save area 14 for saving a status of a processor associated with the pertinent virtual processor, a running priority area 15 for storing the running priority of the virtual processor, a time slice value 16 of the virtual processor, a status table address pointer of the same running priority 17 for queuing the status tables 2-1 to 2-n of the same running priority in the virtual processor control table 3, a status table address pointer of the same VM 18 for storing the addresses of the virtual processor status tables on the same VM, an active flag 19 for indicating whether or not the pertinent virtual processor is active, namely, is running on a processor, a change bit 20 for indicating whether or not the VMCP dynamically alter the running priority of the pertinent virtual processor, and a processor number area 30 for storing the processor number of the processor being running when the active flag 19 contains "1".

Figure 3:
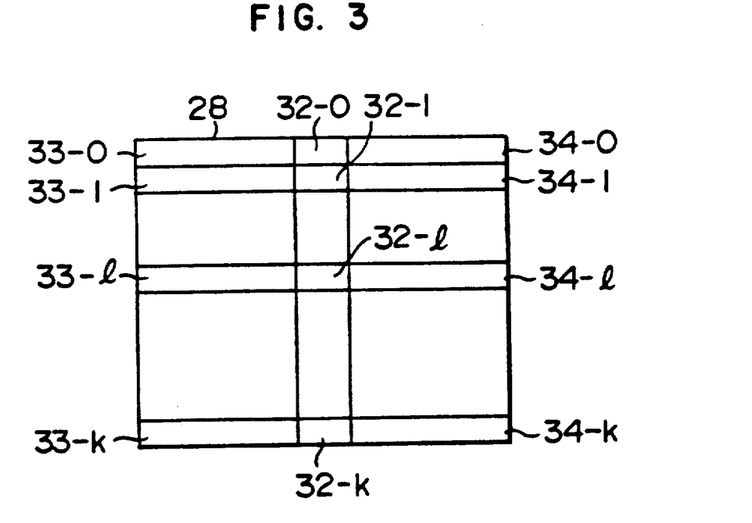
FIG. 3 is an explanatory diagram of a processor status table of FIG. 1.

FIG. 3 is an explanatory diagram depicting the processor status table 28 of FIG. 1. For each processor constituting the machine, the processor status table 28 indicates whether or not the processor is active, furthermore, if the processor is active, it is also indicated which one of the virtual processors is in the active state. That is, if the processor active bit 32-1 is "0", the processor having the processor number 1, namely, for which 1 is stored in the processor number register 31 is indicated to be in the nonactive state. If the processor active bit 32-1 is "1", the processor having the processor number 1 is in the active state, moreover, the virtual processor associated with the status table 2 of which the address is stored in the active status table address area 34-1 is indicated to be in use. A processor lock word 33-1 is a field used to effect a lock in a case where the pertinent processor field is referenced or updated in the processor status table 28.

As a first embodiment, a description will be first given of a case where an OS on a virtual processor in the running state issues an instruction to set the processor to the wait state and the instruction is directly executed by the hardware and the microprogram without any intervention of the VMCP.

The OS on the virtual processor being running sets the PSW 8 to the wait state, namely, in a case where an instruction to set the wait bit 9 to "1" issued via a line 100 to the instruction execute circuit 4 can be directly executed by use of the instruction execute circuit 4 and the instruction execute microprogram 12, the wait bit 9 of the PSW 8 is set to "1" via a line 101. When the wait bit 9 becomes to be "1", the virtual processor status save mechanism 10 is activated through a line 102 and cooperates with the virtual processor status save microprogram to save the virtual processor status as follows.

First, the virtual processor status save mechanism 10 and the virtual processor status save microprogram 11 fetch via a line 121 the value of the address register 35 and saves the value of the content of the processor register 6 in the status save area 14 of the status table 2-1-0 of which the address is indicated by the value by use of the lines 102 and 103. Moreover, the value of the timer 7 is saved in the time slice value field 16 of the status table 2-1-0 through the lines 102 and 103. In addition, by use of the line 103, "0" is set to the active flag 19 of the status table 2-1-0.

Next, the virtual processor status save mechanism 10 and the virtual processor status save microprogram 11 pass control to the dispatch instruction group 29 in the main memory 1. This is accomplished, for example, by setting the address of the dispatch instruction group 29 to a particular register in the processor register 6. Moreover, the addresses of the process status table 28 and the virtual processor control table 3 are also set to particular registers in the processor register 6. Processing of the group of dispatch instructions is accomplished as follows. First, a lock is effected on the processor lock Word 33-1 of the processor status table 28, and it is judged whether or not the processor active bit 32-1 is "1". If the processor is active, namely, if the processor active bit 32-1 is "1", the lock is unlocked and the judgment is conducted on a field associated with the next processor. If the processor is in the nonactive state, namely, if the processor active bit 32-1 is "0", "1" is set to the processor active bit 32-1 and the lock is unlocked. Through this processing, a processor in the nonactive state is selected. From the status tables 2 Which are queued in the virtual processor control table 3 a status table 2 having the highest running priority is selected, and then "1" is set to the active flag 19 of the status table 2. Whether or not the virtual processor associated with the status table 2 is in the wait state can be judged by checking the bit corresponding to the wait bit 9 of the PSW 8 in the status save area 14. Namely, if the bit is "1", the pertinent virtual processor is in the wait state, whereas, if the bit is "0", the virtual processor is in other than the wait state. However, if a Virtual processor satisfying the condition is missing, the processor active bit 32 associated with the selected processor is set to "0" in the processor status table 28.

Let us assume that the virtual processor corresponding to the status table 2-1-1 is in other than the wait state and that the active flag 19 is "0". In this case, the group of dispatch instructions 29 sets the address of the status table 2-1-1 of the selected virtual processor to the active status table address 34 of the selected processor. Furthermore, the processor number of the selected processor is set to the processor number field 30 of the status table 2-1-1. Let us assume that the processor number is equal to the index of the processor status table 28. Namely, m is assigned as the processor number to the processor corresponding to the processor status table 28-m. Next, the dispatch instruction group 29 issues an SIGP instruction commonly used to support the conventional multiprocessor to the selected processor. The SIGP instruction contains as operands thereof a processor number and a Signal Processor Order. In this case, the processor number of the selected processor and an indication to activate the virtual processor are specified for the processor number operand and the Signal Processor Order operand, respectively. The SIGP instruction causes an external interruption to take place in the selected processor and the Signal Processor Order to be transmitted thereto. With the external interruption, the following processing is achieved to activate the processor.

In the external interruption processing, an instruction to read a processor number register is first issued. According to this instruction, the instruction execute circuit 4 and the instruction execute microprogram 12 reads the value of the processor register 31 and stores the value in a register of the processor register 6 or in a specified area of the main memory 1 by use of the lines 100, 101 and 104. Next, a virtual processor corresponding to the status table 2-1-1 of which the address is stored in the active status table address 34 of the processor field associated with the processor number thus obtained from the processor status table 28 by use of the instruction is subjected to a processing so as to be run on the processor. That is, through the lines 100 and 20, the address of the status table 2-1-1 is set to the address register 35, through the lines 100 and 108, the time slice value 16 is set to the timer 7, and through the lines 100 and 101, the content of the status save area 4 is set to the processor register 6. These processing causes the virtual processor corresponding to the status table 2-1-1 to start running.

By repetitiously achieving the processing described above, a virtual processor satisfying the condition for a run thereof can be run on a processor which is other than the pertinent processor and which is in the nonactive state. In addition, the dispatch instruction group 29 selects according to the above-mentioned method a virtual processor having the highest running priority from the virtual processors not in the wait state nor in the active state and sets "1" to the active flag 19 of the status table 2. However, if a virtual processor satisfying the condition is missing, the dispatch instruction group 29 as described above, according to the processor number register read instruction, reads the processor number of the processor from the processor number register 31 by use of the lines 100 and 104 and sets "0" indicating the nonactive state to the processor active bit 32 in the pertinent field of the processor status table 28. If a virtual processor satisfying the condition is present, the processor number 30 is stored in the processor number field of the selected status table 2. Moreover, through the lines 100 and 108, the time slice value 16 of the selected status table 2 is set to the timer 7 by the instruction execute circuit 4 and the instruction execute microprogram 12, and through the lines 100 and 101, the content of the status save area 14 is set to the processor register 6 by the instruction execute circuit 4 and the instruction execute microprogram 12, thereby enabling the selected virtual processor to enter the running state on the processor.

Next, as a second embodiment, a description will be given of a case where during a run of a first virtual processor, an interruption which can be executed by the interruption circuit 5 and the interruption microprogram 13 without any intervention of the VMCP occurs and the wait state of a second virtual processor is released or unlocked by this interruption.

When the interruption is reflected via the line onto the second virtual processor by the interruption circuit 5 and the microprogram 13 and the wait state of the second virtual processor is then unlocked as a result, namely, when the content of the field corresponding to the wait bit 9 is changed from "1" to "0" in the PSW field of the status indicate area 14 of the status table 2 associated with the second virtual processor, an activate signal is sent through the line 106 to the Virtual processor status save mechanism 10. Thereafter, the virtual processor is caused to run in the entirely same processing described in conjunction with the first embodiment.

Next, a third embodiment will be described in which after a virtual processor initiates running, the processing for switching over a virtual processor when the dispatch time given to VM has lapsed is directly effected by the hardware and the microprogram without any intervention of the VMCP.

Also in this case, like in the second embodiment, the interruption circuit 5 and the interruption microprogram 13 sends an activate signal via the line 106 to the virtual processor status save mechanism 10. Thereafter, the dispatch processing of the virtual processor is conducted in almost the same method as for the first embodiment. The differences reside in the following two points.

First, the value to be set to the time slice value 16 of the pertinent status table 2 by the virtual processor status save mechanism 10 and the virtual processor status save microprogram 11 is not the value of the timer 7, namely, for example, a positive value stored in a particular processor register 6 is set thereto via the lines 102-103.

Second, the status table 2 of the virtual processor running up to this point is queued in the last entry of the virtual processor control table 3-i currently being queued. With these alterations, the virtual processor is enabled to run.

Note, as a fourth embodiment, a description will be given of the operation related the instruction to select and to activate a virtual processor. The VMCP is considered to accomplish a change-over processing of virtual processors in a case where after a virtual processor starts running, an interruption processing to be executed when the period of time indicated by the time slice value allocated to the virtual processor is elapsed is conducted by use of the intervention of the VMCP, a case where an instruction which is issued from an OS and which sets the PSW to the wait state is simulated by the VMCP, and a case where the wait state of the virtual processor is released through the simulation of the interruption by the VMCP.

The virtual processor select and activate instruction of the present invention speeds up the change-over processing of the virtual processor in the cases described above.

When a run of a virtual processor is interrupted, the VMCP or the virtual processor status save mechanism 10 and the virtual processor status save microprogram 11 stores or store the status of the virtual processor running up to this point via the lines 102-103 in the status save area 14 of the pertinent status table 2, and then the value of the timer 7 is saved into the time slice value 16 through the lines 122 and 103. In addition, "0" indicating the nonactive state is set to the active flag 19 of the pertinent virtual processor. Next, according to the cause of control transfer to the VMCP, the VMCP performs the processing to be executed when the timevalue is elapsed, the simulation of the instruction that sets the processor to the wait state, and the interruption processing. Thereafter, the VMCP issues the virtual processor select and activate instruction, and then an activate signal of the virtual processor select and activate instruction is outputted via the line 100 to the instruction execute circuit 4. Moreover, the instruction execute circuit 4 and the instruction execute microprogram 12 read via the line 101 the value of the processor register 6-j containing the address of the dispatch instruction group 29 and pass control to the dispatch instruction group 29 in the main memory 1. The processing o.f the dispatch instruction group 29 is completely the same as for the first embodiment. Through these processing, the virtual processor which is ready to run can be set to the run state.

Next, as a fifth embodiment, a description will be given of processing in a case where a virtual processor 1 attempts to reference and update an area locked by a virtual processor 2 in the same VM.

Figure 4:
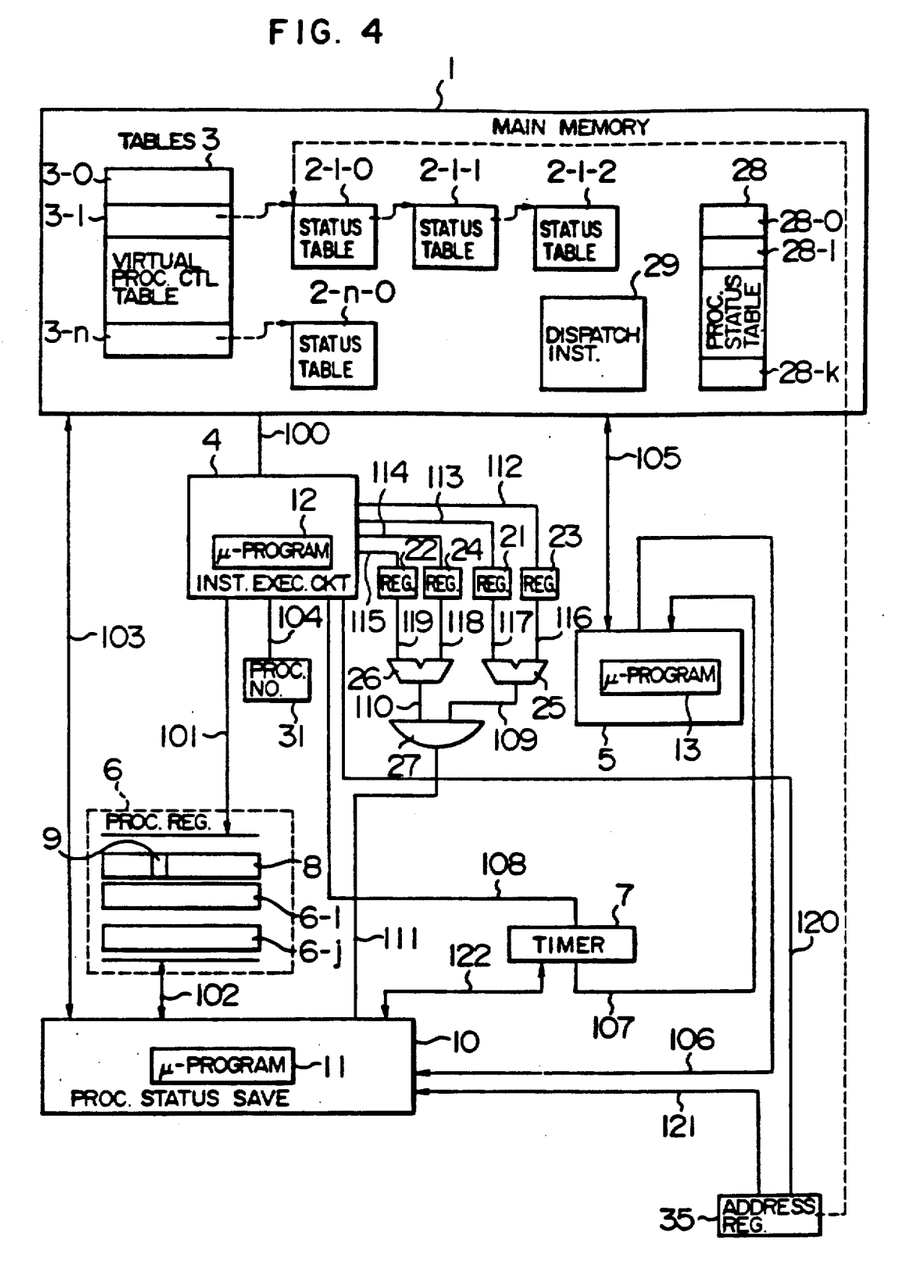
FIG. 4 is a block diagram illustrating a VMS of another embodiment of the present invention.

FIG. 4 is a schematic block diagram showing the VMS as another embodiment of the present invention. The configuration of FIG. 4 is different from that of FIG. 1 in that the registers 21-24 for the instruction code and the like and arithmetic units 25-26 are connected to the instruction execute circuit 4. This system includes an instruction code register 21 for keeping an instruction code of an instruction being executed a condition code register 22 for keeping a condition code of the instruction, an instruction code keep register 23 for keeping an instruction code of a particular instruction, a condition code keep register 24 for keeping a particular condition code, compare circuits 25-26, and an AND circuit 27.

When an OS issues an instruction, an instruction activate signal is outputted via the line 100 to the instruction execute circuit 4. The instruction execute circuit 4 and the instruction execute microprogram 12 initialize the condition code register 22 via the line 115 and then set the pertinent instruction code via the line 113 to the operation code register 21. In addition, when the condition code of the instruction is determined, the instruction execute circuit 4 sets the condition code to the condition code register 22. In this embodiment, there are provided an operation code register 21 and a condition code register 22, however, a plurality of operation code registers and condition code registers may be naturally disposed.

Figure 5:
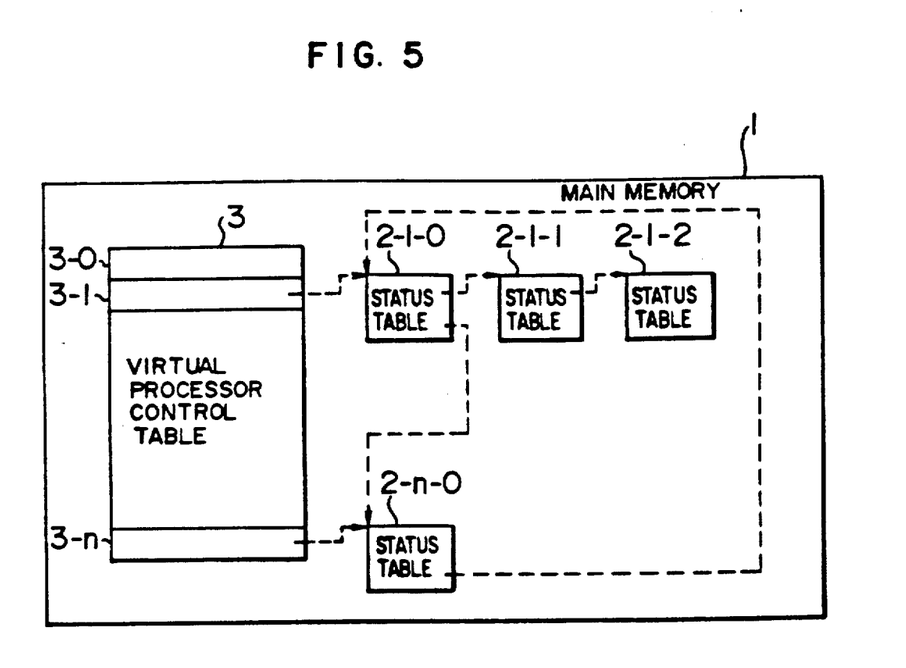
FIG. 5 is an explanatory diagram for explaining a method for queuing the status table according to the present inVention.

FIG. 5 is an explanatory diagram of a method for queuing the status table according to the present invention. In FIG. 5, the status tables 2-1-0 and 2-n-0 correspond to the different virtual processors, rsepectively on the same VM and are pointed by the status table address pointer of the same VM 18 (FIG. 2). It is assumed that the status tables 2 corresponding to all virtual processors of the same VM are linked regardless of whether or not the virtual processors are in the wait state.

An operation code to be used by an OS to judge whether or not an area has been locked and a condition code set to the PSW 8 in the instruction of the operation code when the area has been locked by another processor are beforehand set to the operation code keep register 23 and the condition code keep register 24, respectively by use of an instruction unique to VMCP through the lines 100, 112, and 114.

When an OS of a virtual processor 1 being running and being associated with the status table 2-1-0 issues an instruction having an operation code in the operation code keep register 23 and the condition code thereof is that indicated by the condition code register 24, signals are sent through the lines 116-119 to the compare circuits 25-26; thereafter signals are transmitted via the lines 109-110 to the AND gate 27, and the virtual processor change-over control mechanism (status save mechanism) 10 is activated by use of the line 111. The virtual processor change-over control mechanism 10 and the virtual processor change-over microprogram (status save microprogram) 11 fetch the value of the processor register 6 through the line 102 and saves the value via the line 103 in the status save area 14 of the status table 2-1-0 of which the address is stored in the address register 35. Next, the value of the timer 7 is stored through the lines 122 and 103 in the time slice value 16. In addition, "0" is set to the active flag of the statuas table 2-1-0.

The virtual processor change-over control mechanism 10 and the virtual processor change-over control microprogram 11 transfer control to the group of dispatch instructions 29 in the main memory 1. The processing of the dispatch instruction group 29 is almost the same as for the first embodiment, but the difference exists in the method for selecting the virtual processor as the object to be set to the running state. In this embodiment, from the virtual processors which are other than the virtual processor running up to the interception point and which are on the same VM as for the virtual processor, a virtual processor not in the wait state nor in the active state is selected by using the status table address pointer of the same VM 18. This enables to run on the same VM a virtual processor other than the intercepted virtual processor.

Although the virtual processor running up to the point is once set to the nonactive state in this embodiment, it is also possible to allow the active state to be retained and that after a dispatch processing of a virtual processor is finished on another processor, the intercepted virtual processor may be continuously set to the running state. Moreover, this embodiment implements the group of dispatch instructions 29 by use of a software; however, a microprogram is also applicable to the implementation of the dispatch instruction group 29.

Finally, a description will be given of a method for setting the running priority 15 in the status table 2 and the virtual processor change-over processing when the VM or the VMCP is of the multiprocessor configuration.

The running priority 15 can be fixedly assigned from the VMCP by use of a command or the like, or the VMCP may dynamically vary the running priority 15. For example, with the prior art technology, it is possible to allow the running priority 15 to be changed on by a command when the change bit 20 is "1" and to allow the VMCP to dynamically alter the running priority 15 based on the CPU utilization ratio or the like during a run of the pertinent virtual processor.

In a case where the time slice value 16 is to be varied corresponding to the running priority 15, it is only necessary to dispose a correspondence table containing the correspondence between the running priority 15 and the time slice value 16, so that the time slice value 16 is updated by use of the correspondence table each time the running priority 15 changes.

Although the description has been omitted in these embodiments, if the VM or the VMCP is of the multiprocessor configuration and a reference and/or an update are/is accomplished on the virtual processor control table 3, the status table 2, and/or the processor status table 28, such tables are to be locked according to the ordinary multiprocessor technique in advance to prevent the other processors or the other virtual processors from effecting a reference and/or an update thereon.

According to the present invention as described above, when a virtual processor is set to the wait state on a VM or is set to the loop state due to a lock set from another virtual processor on the same VM, a virtual processor ready to run can be activated on a processor on which the virtual processor was running up to this point or on a processor in other than the active state, which leads to an efficient use of processors in a virtual machine of the multiprocessor configuration.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. In a virtual machine system comprising a real machine including a real main storage area and a plurality of real processors and virtual machines each including a virtual main storage area, an operating system, and a plurality of virtual processors, wherein the virtual machines are capable of simultaneous running on the real machine under control of dispatch instructions, a dispatch control method comprising the steps of:

(a) providing a status indicator for each of said virtual processors, said status indicator including start information required for starting of said virtual processor, wait information indiating whether said virtual processor is in a wait state, and running information indicating whether said virtual processor runs on a certain one of said real processor in said real machine;

(b) detecting whether a relevant portion of said virtual main storage area is in a virtual lock state in response to a lock judge instruction executed by a virtual processor running on a real processor in said real machine, said virtual lock state being a state in which only one virtual processor successful for a lock instruction to the relevant portion of said virtual main storage area, belonging to the virtual machine to which said running virtual processor belongs, can make reference to or update the relevant portion of said virtual main storage area;

(c) intercepting, in response to detection of said virtual lock state by said detecting step (b), the running of said virtual processor;

(d) executing, in response to interception of said running of said virtual processor by said intercepting step (c), said dispatch instructions by referring to said status indicators of step (a) to select another virtual processor belonging to the virtual machine to which said intercepted virtual processor belongs, said another virtual processor having not been in a wait state and having not been running on any real processor of said real machine; and (e) starting the selected virtual processor to a selected one of said plurality of real processors on which said virtual processor can run.

2. The dispatch control method according to claim 1, wherein said status indicator of step (a) further includes link information for linking status indicators for the virtual processors contained in the same virtual machine, and;

wherein said dispatch instruction executing step (d) uses said link information to select another virtual processor.

3. A dispatch controller in a virtual machine system capable of simultaneously running virtual machines each having at least one virtual processor and an operating system, on a real machine having at least one real processor, comprising;
  (a) processor status table maens for storing information as to whether each real processor in said real machine is in a state ready for starting any virtual processor;
  (b) status indicator table means provided for each of the virtual processors for storing start information for each virtual processor, wait information indicating whether each virtual processor is in a wait state, and running priority information; and
  (c) dispatch means responsive to a request for intercepting running of the virtual processor on a real processor in said real machine coupled to said processor status table means and said status indicator table means for selecting one of the virtual processors not being in a wait state, based on said running priority information, and starting the selected virtual processor on said real processor on which said request is issued and on which the virtual processor can run.

4. The dispatch controller in a virtual machine system according to claim 3, including means for issuing a request for intercepting running of the virtual processor by said dispatch means when the virtual processor enters the wait state.

5. The dispatch controller in a virtual machine system according to claim 3, including means for issuing a request for intercepting running of the virtual processor by said dispatch means when an interruption is caused in a real processor on which the virtual processor is running to release a wait state of another virtual processor.

6. The dispatch controller in a virtual machine system according to claim 3, including means for issuing a request for intercepting running of the virtual processor by said dispatch means when a given time lapses after starting of the virtual processor.

7. In a virtual machine system comprisnig a real machine having a plurality of real processors, and one or more virtual machines each having a virtual main storage area, an operating system, and a pluraliyt of virtual processors therein, wherein the virtual machines are capable of simultaneous running on the real machine, a dispatch control apparatus comprising:
  (a) processor status table means for holding start information indicating whether each real processor is available for starting a virtual processor;
  (b) status indicator table means provided for each virtual processor for holding start information required for starting the virtual processor, and wait information indicating whether the virtual processor is in a wait state;
  (c) lock detect means responsive to execution of a lock judge instruction by a virtual processor running on one real processor of said real machine for detecting a lock state or a relevant portion of said virtual main storage area said lock state being a state in which only on virtual processor successful in a lock instruction to the relevant portion of said virtual main storage area, belonging to the virtual machine to which said running virtual processor belongs, can make reference to or update the relevant portion of said virtual main storage area;
  (d) intercept means responsive to detection of a lock state from said lock detect means for intercepting running of the virtual processor; and
  (e) dispatch means for controlling starting of the virtual processor, said dispatch means including select means responsive to detection of a lock state in a virtual processor being run, by said lock detect means, for referring to said processor status table means and said status indicator table means to select another virtual processor in the virtual machine to which said lock-detected virtual processor belongs and which is not in a wait state, and start means responsive to said select means for starting the selected virtual processor on a selected one of the plurality of real processors on which the virtual processor can run.

8. The dispatch controller apparatus according to claim 7, wherein said status indicator table means further includes information concerning running priority of virtual processors and link information for linking those of the status indicator table means belonging to the same virtual machine.

9. The dispatch controller in a virtual machine system according to claim 4, further comprising means for providing instructions to refer to said processor status table and said status indicator table and thereby select at least one of said virtual processors not being in a wait state, based on the running priority and start the selected virtual processor on one of said real processors on which said virtual processor is ready for running.

10. In a virtual machine system comprising a real machine including a real main storage area and a real processor, and virtual machines each including a virtual main storage area and a plurality of virtual processors, wherein the virtual machines are capable of simultaneous running on the real machine under control of dispatch instructions, a dispatch control method comprising the steps of:
  (a) providing a status indicator for each of said virtual processors, said status indicator including start information required for starting of said virtual processor, wait information indicating whether said virtual processor is in a wait state, and running information incidating whether said virtual processor runs on said real processor in said real machine;
  (b) detecting whether a relevant portion of said virtual main storage area is in a virtual lock state in response to a lock judge instruction executed by a virtual processor running on said real processor in said real machine, said virtual lock state being a state in which only one virtual processor successful in a lock instruction to the relevant portion of said virtual main storage area, belonging to the virtual machine to which said running virtual processor belongs, can make reference to or update the relevant portion of said virtual main storage area;
  (c) intercepting, in response to detection of said virtual lock state by said detecting step (b), the running of said virtual processor;
  (d) executing, in response to interception of said running of said virtual processor by said intercepting step (c), said dispatch instructions by referring to said status indicators of step (a) to select another virtual processor belonging to the virtual machine to which said intercepted virtual processor belongs, said another virtual processor having not been in a wait state and having not been running on said real processor of said real machine; and
  (e) starting the selected virtual processor on said real processor.

11. In a virtual machine system comprising a real machine having one real processor, and one or more virtual machines each having a virtual main storage area and a plurality of virtual processor therein, wherein the virtual machines are capable of simultaneous running on he real machine, a dispatch control apparatus comprising:
- (a) processor status table means for holding start information incidating whether said real processor is available for starting a virtual processor;
- (b) status indicating table means provided for each virtual processor for holding start information required for starting the virtual processor, and wait information indicating whether the virtual processor is in a wait state;
- (c) lock detect means responsive to execution of a lock judge instruction by a virtual processor running on said real processor of said real machine for detecting a lock state of a relevant portion of said virtual main storage area, said lock state being a state in which only one virtual processor successful in a lock instruction to the relevant portion of said virtual main storage area, belonging to the virtual machine to which said running virtual processor belongs, can make reference to or update the relevant portion of said virtual main storage area;
- (d) intercept means responsive to detection of a lock state from said lock detect means for intercepting running of the virtual processor; and
- (e) dispatch means for controlling starting of the virtual processor, said dispatch means including select means responsive to detectino of a lock state in a virtual processor being run, by said lock detect means, for referring to said processor status table means and said status indicator table means to select another virtual processor in the virtual machine to which said lock-detected virtual processor belongs and which is not in a wait state, and start means responsive to said select means for starting the selected virtual processor on said real processor on which the virtual processor can run.

* * * * *